(12) United States Patent
Forsberg

(10) Patent No.: US 7,248,797 B2
(45) Date of Patent: *Jul. 24, 2007

(54) TRANSMITTER-RECEIVER DEVICE AND A COMMUNICATION SYSTEM

(75) Inventor: Gunnar Forsberg, Stockholm (SE)

(73) Assignee: Transmode Systems AB, Stockholm (SE)

( * ) Notice: Subject to any disclaimer, the term of this patent is extended or adjusted under 35 U.S.C. 154(b) by 661 days.

This patent is subject to a terminal disclaimer.

(21) Appl. No.: 10/381,481

(22) PCT Filed: Sep. 27, 2001

(86) PCT No.: PCT/SE01/02084

§ 371 (c)(1),
(2), (4) Date: Mar. 26, 2003

(87) PCT Pub. No.: WO02/27978

PCT Pub. Date: Apr. 4, 2002

(65) Prior Publication Data

US 2004/0047554 A1 Mar. 11, 2004

(30) Foreign Application Priority Data

Sep. 29, 2000 (SE) .................................... 0003514

(51) Int. Cl.
*H04B 10/00* (2006.01)

(52) U.S. Cl. ........................... 398/15; 398/16; 398/17; 398/30; 398/31; 398/33

(58) Field of Classification Search ............ 398/15–17, 398/20–22, 30–34, 151, 162, 163
See application file for complete search history.

(56) References Cited

U.S. PATENT DOCUMENTS

| 5,136,410 | A | * | 8/1992 | Heiling et al. ................ 398/15 |
| 5,956,168 | A | | 9/1999 | Levinson et al. |
| 6,359,713 | B1 | * | 3/2002 | DeCusatis et al. .......... 398/178 |
| 6,438,285 | B1 | * | 8/2002 | DeCusatis et al. ............ 385/24 |
| 6,504,630 | B1 | * | 1/2003 | Czarnocha et al. ........... 398/15 |
| 6,658,030 | B1 | * | 12/2003 | Baumgartner et al. . 372/29.021 |
| 2004/0017959 | A1 | * | 1/2004 | Forsberg ........................ 385/2 |

FOREIGN PATENT DOCUMENTS

| DE | 4317863 | | 12/1994 |
| DE | 4421642 | | 1/1996 |
| EP | 1006682 | | 6/2000 |
| GB | 2348063 | | 9/2000 |
| JP | 02121537 A | * | 5/1990 |

* cited by examiner

*Primary Examiner*—Dalzid Singh
(74) *Attorney, Agent, or Firm*—Bingham McCutchen LLP

(57) ABSTRACT

The invention concerns a transmitter-receiver device (A, B) which comprises a receiver unit (RXA) arranged to receive light and optical signals from a transmitter unit (TXA) arranged to transmit light and optical signals. The device also comprises a supervising unit (CUA) which prevents the transmitter unit (TXA) from continuously transmitting light when the supervising unit (CUA) detects that the receiver unit (RXA) does not receive light. The supervising unit (CUA) is arranged to, when it detects that the receiver unit (RXA) does not receive light, change to a test mode where the transmitter unit (TXA) is controlled to intermittently transmit short light pulses the supervising unit has an output (109) where a status signal indicates whether the transmitter-receiver device is in said test mode. The invention also concerns a communication system which comprising at least two such transmitter-receiver devices.

13 Claims, 2 Drawing Sheets

TRANSMITTER-RECEIVER DEVICE AND A COMMUNICATION SYSTEM

BACKGROUND OF THE INVENTION AND PRIOR ART

The present invention concerns a transmitter-receiver device which may be used to transfer information optically. Such a transmitter-receiver device may form part of a communication system for bidirectional transfer of optical signals. The invention also concerns such a communication system.

FIG. 1 shows schematically an example of a bi-directional communication system according to the prior art for transferring optical signals. The system comprises a first transmitter-receiver device A with a receiver unit RXA and a transmitter unit TXA. The transmitter-receiver device A communicates with a similar transmitter receiver device B. Also the transmitter-receiver device B thus comprises a transmitter unit TXB and a receiver unit RXB. The transmitter unit TXB transmits optical signals over a first optical fibre F1 to the receiver unit RXA. In a similar manner, the transmitter unit TXA transmits optical signals over a second optical fibre F2 to the receiver unit RXB. In such a system, the light that is transmitted from the respective transmitter unit TXA, TXB often has an essentially constant average power, i.e. light is normally transmitted all the time. The information transfer is carried out through a suitable modulation of this light signal.

The receiver units RXA, RXB may have an output UA, UB, respectively, which for example may assume two logical values depending on if the optical power received in the receiver units RXA, RXB exceeds a certain value. This output UA, UB may for example be connected to an indicator IA, IB, for example in the form of a light emitting diode. Such an indicator IA, IB may for example emit light if the respective receiver unit RXA, RXB receives light. In such a manner, the respective indicator IA, IB may indicate that the connection over the fibre F1, F2 works. The signal from the output UA or UB may also be connected to a network management system NMS. Such a network management system NMS supervises the communication system and makes it possible to, from a completely different position than where the transmitter-receiver devices A and B are located, supervise whether the bi-directional communication system works. The lines 131, 133, 135, and 137 are intended to transfer information carrying signals, for example as electric signals, to and from the transmitter and receiver units RXA, TXA, TXB, and RXB.

In the system according to FIG. 1, for example the transmitter-receiver device B may be arranged in a home and the second transmitter-receiver device A may constitute a centrally located device which transmits signals to the home and receives signals from the home. In order to supervise the system it is desirable to connect the device B to the network management system NMS. If, for example, the device B is positioned in a home or in an office, this device often has no other connection out from the home or the office than via the optical fibres F1 and F2. It is actually conceivable to connect the device B to a network management system via the fibre F1. However, it is relatively expensive and complicated to, in addition to the normal information signals, also transmit signals concerning the network management on the same fibre F1. Furthermore, this network management does not work in case of a breakage of the fibre F1. Since the network management system NMS is intended to supervise the function of the network, it is desirable that this supervision works also in case an error occurs in the communication between the devices A and B. It is, of course, conceivable that the network management system NMS may supervise the device B via another line than via F1 or F2, for example in the home there may be a telephone modem, over which this supervision takes place. This constitutes, however, a complicated solution for transferring signals to the network management system NMS. It is, of course, also possible that a person goes to the device B in order to personally check if, for example, the indicator IB is lit. This may possibly be acceptable within, for example, an office where the distance to B may be short. However, it becomes much more complicated to send a person to the device B if this device is located at a long distance from the position where the person normally is.

As a background to the present invention, also so-called eyesafe fibre communication systems should be mentioned. A problem with fibre communication systems is that the light intensity which is transmitted over the fibres may be relatively high. If, for example, a fibre is broken and if somebody looks into the fibre, damages of the eye might occur. If a fibre is broken or damaged, it is therefore desirable to cut off the light signal which is transmitted over this fibre. For example U.S. Pat. No. 5,136,410 describes such a system.

With reference to FIG. 1 it will now briefly be described how an eye-safe system may work. Suppose that a breakage takes place of the fibre F1. The output UA thereby indicates that no light is received in the receiver unit RXA. A supervising unit (not shown in FIG. 1) may then cut off the transmission of light from the transmitter unit TXA. At the receiver unit RXB it is thereby detected that no light is received. Another supervising unit in connection to the device B thereby immediately cuts off the transmission of light from the transmitter unit TXB. Thereby, no harmful light exists on the broken fibre F1. In order to check if the connection via the fibre F1 works again, the respective transmitter unit TXA, TXB often transmits short light pulses at regular intervals. These light pulses are so short that they are not harmful to the eye. When one receiver unit RXB receives such a light pulse, a similar light pulse is immediately transmitted by the transmitter unit TXB. As long as the breakage of the fibre F1 is the case, the receiver unit RXA does not detect any such light pulse. If, however, the fibre F1 works again, the receiver unit RXA will detect such a response pulse from TXB immediately after TXA having transmitted a pulse to RXB. The connection thus works again and the respective transmitter unit TXA, TXB may now continuously transmit light. The time between the light pulses in such a safety system is usually quite long, for example U.S. Pat. No. 5,136,410 mentions that the time between these pulses is about 49 seconds.

SUMMARY OF THE INVENTION

An object of the present invention is to achieve a transmitter-receiver device which may be used in a bidirectional optical communication system with improved network management possibilities compared to previous systems. The above-described disadvantages with such previous systems should therefore be avoided with the present invention.

This object is achieved with a transmitter-receiver device comprising:

a receiver unit arranged to via a first optical conduction path receive light and optical signals and comprising a first output which indicates whether the receiver unit receives light, a transmitter unit arranged to, on a second optical conduction path, transmit light and optical signals and comprising a first input which controls whether the transmitter unit shall transmit light, a supervising unit with a second input connected to said first output and a second output connected to said first input and arranged to, via said second output, prevent the transmitter unit from continuously transmitting light when the supervising unit via the second input detects that the receiver unit does not receive light, wherein the supervising unit is arranged to, when it detects that the receiver unit does not receive light, change to a test mode where the supervising unit controls the transmitter unit to intermittently transmit short light pulses on said second optical conduction path, wherein the supervising unit is arranged with a third output where a status signal indicates whether the transmitter-receiver device is in said test mode.

Since the transmitter-receiver device is arranged with such a third output and a status signal which indicates if the transmitter-receiver device is in the test mode or not, the transmitter-receiver device may be used in a bidirectional system where a network management system connected to one side may also supervise the status of the other side. This will become clear from the description below.

According to an embodiment of the invention, the supervising unit is arranged such that when the transmitter-receiver device is in said test mode, the time between said light pulses is less than 1 s. Since the time between the light pulses is so short, the device according to the invention may suitably be used in a system with a safety function which operates essentially quicker than according to the above-described system. Furthermore, this short time makes it possible that the status of different signals of one side of a bi-directional system corresponds to the status signals on the other side of the system.

According to another embodiment of the invention, the supervising unit is arranged such that when the transmitter-receiver device is in said test mode, the time between said light pulses is less than 0.1 s. Since said time is this short, the agreement between the status of the two sides of a system in which the device forms part is further improved. As also will become clear from the description below, such a short time also makes it possible to in a simple manner measure with a normal optical power meter whether a connection is the case between two parts in a bidirectional fibre optic system.

According to another embodiment, the transmitter-receiver device comprises a first indicator, which gives a visual indication of the status of the signal from said third output. It is hereby made possible that a person who is located at the indicator, which preferably is positioned at the transmitter-receiver device, directly may observe which status the signal from the third output has.

According to still an embodiment, the receiver unit is arranged with a fourth output which is connected to the supervising unit, at which fourth output a signal is the case which indicates whether the receiver unit, via the first optical conduction path, receives an information carrying input signal, wherein the supervising unit has a fifth output with a status signal which depends both on the status of the signal of said third output and the status of the signal from said fourth output. According to this embodiment, it may, via the fifth output, be supervised whether the receiver unit receives an information carrying signal over a working optical conduction path.

According to another embodiment, the transmitter-receiver device comprises a second indicator, which gives a visual indication of the status of the signal from said fifth output. A person may thereby visually observe the status of the fifth output.

According to another embodiment, the transmitter unit is arranged with a sixth output which is connected to the supervising unit, at which sixth output a signal is the case which indicates whether the transmitter unit receives an electric information carrying input signal, wherein the supervising unit has a seventh output with a status signal which depends both on the status of the signal of said third output and the status of the signal from said sixth output. With the help of this seventh output, it may be supervised whether the transmitter unit transmits information over a working connection.

According to a further embodiment, the transmitter-receiver device comprises a third indicator, which gives a visual indication of the status of the signal from said seventh output. This allows for a visual supervision of the status of the seventh output.

According to still another embodiment, the supervising unit is arranged such that the status of the signals at said third, fourth, fifth, sixth, and seventh outputs fulfils the status schedule according to claim 9. According to this embodiment, the status of the different outputs may be supervised or indicated. It will become clear from the description below that hereby it is made possible that by supervising one side of a bi-directional communication system it is possible to know the status also of the corresponding outputs of the second side of the communications system.

As has been mentioned above, a further object of the invention is to achieve a communication system. The object thereby is to achieve a system with improved network management possibilities compared to previous systems.

This object is achieved with a communication system comprising a first transmitter-receiver device according to any of the preceding embodiments and a second transmitter-receiver device according to any of the preceding embodiments, and a first and a second optical conduction path which connect the first and the second transmitter-receiver devices to each other, wherein the first optical conduction path is connected to the receiver unit of the first transmitter-receiver device and the transmitter unit of the second transmitter-receiver device, wherein the second optical conduction path is connected to the receiver unit of the second transmitter-receiver device and the transmitter unit of the first transmitter-receiver device.

With such a communication system, the above-described advantages are achieved. Such a system makes it possible to, by supervising the status of one side of the system, also have information about the status of the corresponding signals of the other side of the system.

According to a preferred embodiment of the communication system, it comprises a network management system, wherein at least one of said first and second transmitter-receiver devices is connected to the network management system. With the help of the network management system, the function of both transmitter-receiver devices may thereby be supervised even if the network management system is only connected to one of the devices.

According to another preferred embodiment of the communication system, at least said third output of said at least one transmitter-receiver device is connected to the network management system. The network management system may hereby supervise whether a working connection is the case between the two transmitter-receiver devices.

According to another preferred embodiment of the communication system, said at least one transmitter-receiver device is arranged such that also said fifth and seventh outputs are connected to the network management system. The network management system may hereby supervise the status of several of said outputs.

According to another embodiment of the communication system, the communication system is arranged such that said third, fifth, and seventh outputs of the first transmitter-receiver device, except for possibly during a short time delay, have the same status as the third, seventh, and fifth, respectively, outputs of the second transmitter-receiver device. By supervising one of the transmitter-receiver devices, information may hereby also be obtained concerning the corresponding outputs of the second transmitter-receiver device.

DETAILED DESCRIPTION OF EMBODIMENTS OF THE INVENTION

Figure 1:
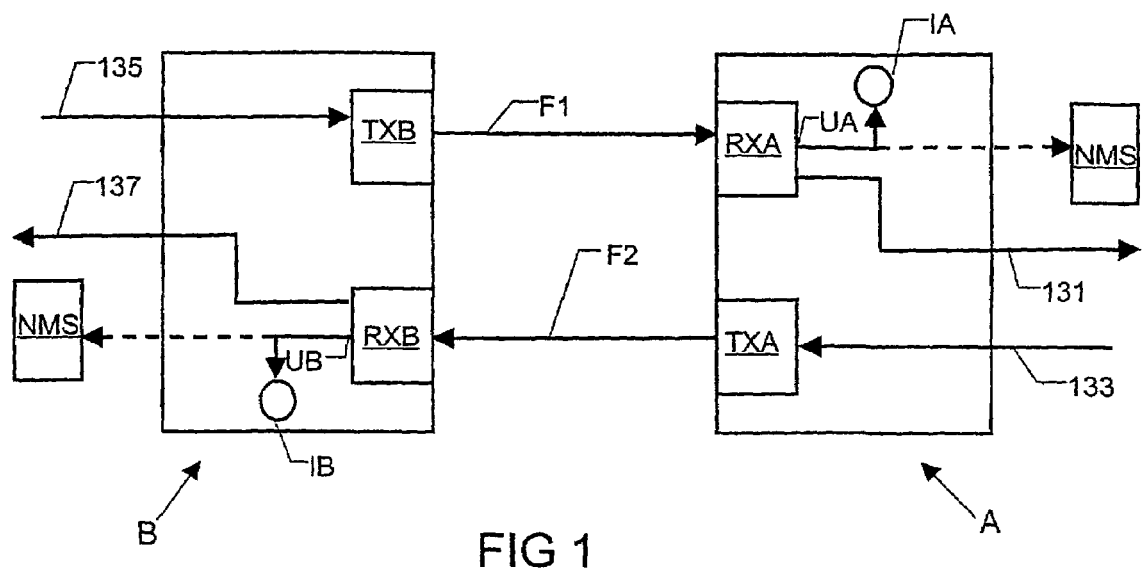
FIG. 1 shows schematically a bidirectional fibre optic communication system according to the prior art.
Figure 2:
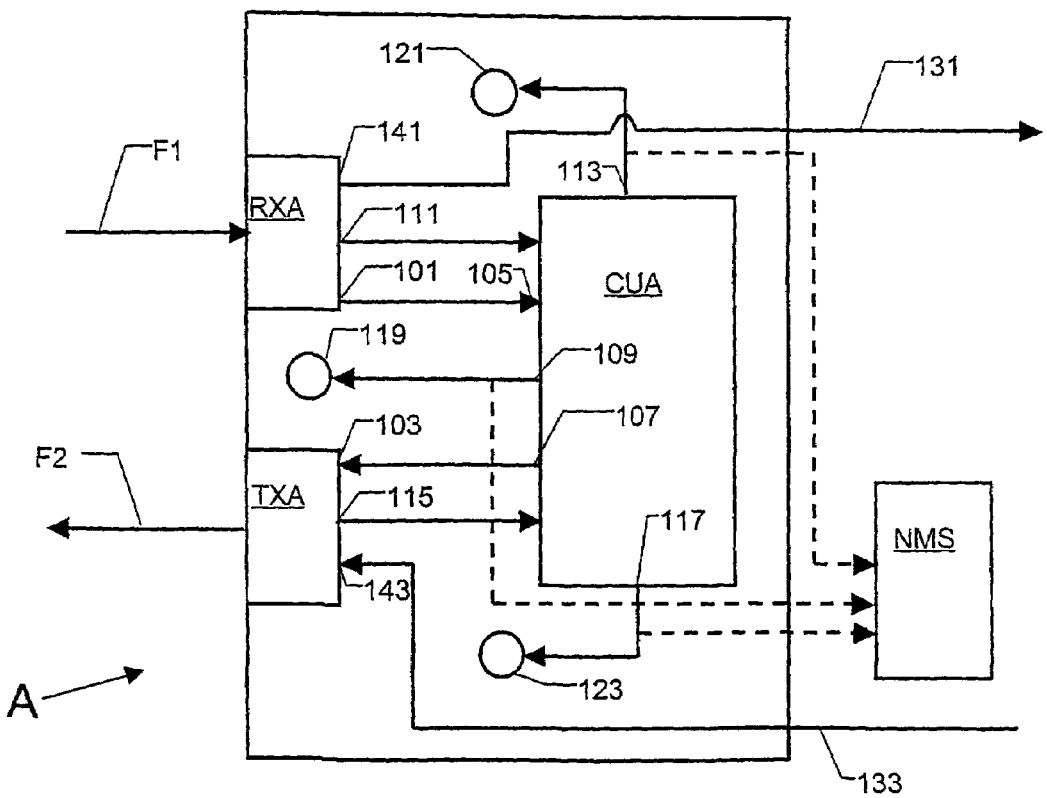
FIG. 2 shows schematically a transmitter-receiver device according to the present invention.

FIG. 2 shows a transmitter-receiver device A according to an embodiment of the present invention. In a communication system according to the invention, suitably two such transmitter-receiver devices A, B form part, which devices are connected in the manner shown in FIG. 1.

FIG. 2 shows a first optical conduction path F1. Furthermore, FIG. 2 shows a second optical conduction path F2. These first and second optical conduction paths F1, F2 may suitably consist of optical fibres. The transmitter-receiver device A comprises a receiver unit RXA which receives light from the optical fibre F1. Furthermore, there is a transmitter unit TXA which transmits light on the optical fibre F2. The receiver unit RXA has a first output 101 which indicates whether the receiver unit RXA receives light. The transmitter unit TXA has a first input 103 which controls whether the transmitter unit TXA shall transmit light in response to an electric input signal.

The device also comprises a supervising unit CUA. The supervising unit CUA has a second input 105 connected to the first output 101 and a second output 107 connected to the first input 103. The supervising unit CUA is arranged to prevent the transmitter unit TXA from continuously transmitting light when the supervising unit CUA detects that the receiver unit RXA does not receive light. Furthermore, the supervising unit CUA is arranged to change to a test mode when it detects that the receiver unit RXA does not receive light. During the test mode, the supervising unit CUA controls the transmitter unit TXA to intermittently transmit short light pulses on the second optical fibre F2. This function is thus similar to previously known eye-safe systems.

The supervising unit CUA has a third output 109 where a status signal indicates whether the device is in said test mode. The supervising unit CUA may be implemented in hardware or in software. For example, the supervising unit CUA may consist of a so-called microcontroller.

The third output 109 may be connected to a first indicator 119 and/or to a network management system NMS. If the third output 109 is connected to an indicator 119, this indicator 119 may, according to a preferred embodiment, emit light if the device is in said test mode and be put out if the device is not in the test mode. The indicator 119 may, for example, consist of a red light emitting diode.

As has been described above, said test mode means that the transmitter unit TXA only intermittently transmits short light pulses. If the device A forms part of a bi-directional system with a corresponding device B, this means that the receiver unit TXB does not detect any continuous light on the fibre F2 when the device A has entered into said test mode. This means that also the device B enters into the test mode, wherein a corresponding output 109 in the device B has the same status as the output 109 in the device A. According to a preferred embodiment of the invention, the distance between the light pulses in the test mode is less than 1 second, preferably less than 0.1 second and most preferred less than 5 milliseconds. The length of the pulses in the test mode is suitably 0.1%-25%, preferably 3%-20%, and most preferred 5%-13% of the distance between light pulses.

Figure 3:
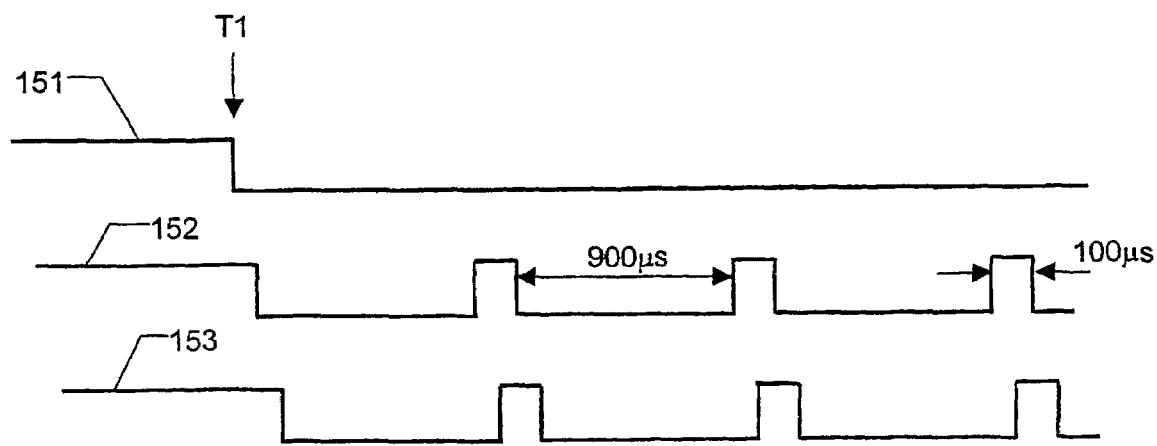
FIG. 3 shows the course of events in time for the function of the invention when a disruption occurs on an optical connection.
Figure 4:
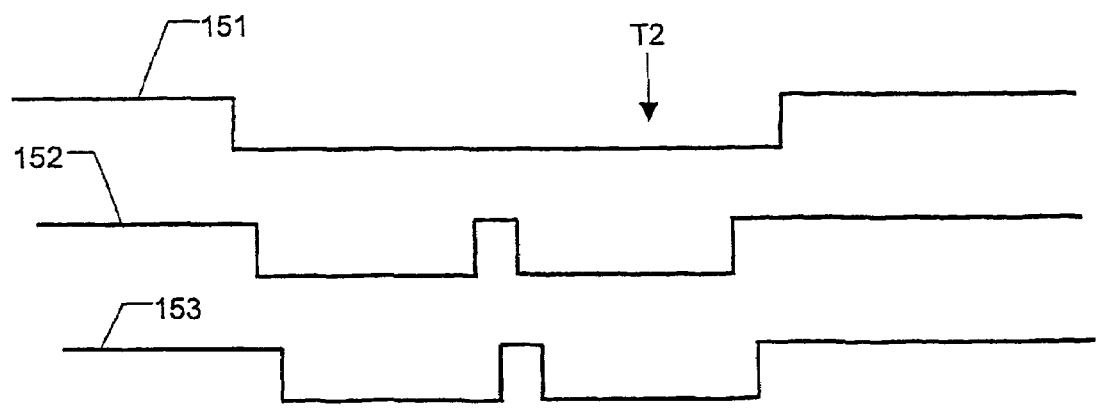
FIG. 4 shows a similar course of events in time as FIG. 3 when a connection is created again in the previously disrupted optical connection.

With reference to FIGS. 3 and 4 it will now be described how the device is arranged to function when a disruption occurs in the connection between a first and a second device A, B. Suppose that a disruption occurs in the fibre F1 at the time T1. The upper graph 151 in FIG. 3 shows the light intensity which reaches RXA. This intensity thus sinks at the time T1 when a disruption takes place in the fibre F1. The supervising unit CUA thereby controls the device A such that it changes into said test mode. The second graph 152 in FIG. 3 shows the light that is transmitted from TXA. Shortly after the time T1, because of a small delay in the electronics, the device A changes to said test mode. According to the shown embodiment, TXA transmits, during the test mode, intermittently short light pulses, wherein each light pulse is only 100 μs. The distance between the light pulses is, according to this embodiment, 900 μs. The light pulses which are transmitted from TXA are received by RXB. Because of the transfer time in the fibre F2, these pulses are received somewhat later than when they are transmitted. TXB is controlled by a supervising unit in such a manner that TXB transmits light as soon as RXB receives light. The graph 153 in FIG. 3 shows the light which is transmitted from TXB. As can be seen in FIG. 3, TXB therefore transmits light pulses in the same manner as TXA during the test mode but with a small time delay caused by a delay in the transfer and in the electronics. This means that if the device A changes into the test mode, then also the device B changes into this mode.

FIG. 4 shows the same graphs as FIG. 3 when the connection along the fibre F1 is re-established. It is assumed that this connection is re-established at the time T2. When the next pulse is transmitted from TXA, RXA receives an answer from TXB before TXA has been switched off. This means that TXA is allowed to continue to be switched on, which means that RXB senses a continuous input power and therefore lets TXB be switched on. The connection is thus re-established.

Since the device B is in the test mode when and only when the device A is in said test mode (except for a small time delay), it follows that said third output 109 of the device A always has the same status as the corresponding output of the device B. By supervising the status of this output 109 in the device A, information is thus obtained also concerning the status of the corresponding output in the device B. This means that a network management system NMS connected to the device A indirectly also supervises the device B.

There are further advantages in that the device has such a short time distance between the pulses when it is in said test mode. One reason is that a user who, for example, connects and disconnects optical contacts immediately will see if the connection works or not. Since the test mode works with said short time distance, information may immediately be obtained concerning the fact that the optic connection works. A human being has a certain reaction time and a certain perception of whether different events are simultaneous or not. Delays which are essentially longer than this reaction time are often perceived as irritating. With the present invention, such an irritation can be avoided.

Another advantage is that one sometimes with an optical power meter would like to measure if there is power in a fibre or not. This is usually done in that the fibre is disconnected from a receiver unit and connected to a power meter. Since the fibre is disconnected, the device changes to the test mode. Since the pulses during the test mode arrive with such a short time distance, a normal optical power meter will measure a certain power in the fibre, This measured power corresponds to the average power in the fibre. This average power during the test mode is, for example, ten times lower than the normal power when the connection is not in the test mode. With the help of the power meter, information may thus immediately be obtained concerning whether test pulses are received at the power meter. This means that the fibre in question is not broken, since otherwise no test pulses would reach the power meter. With a conventional slower device, on the other hand, where the distance between the pulses is essentially longer, one would with a power meter for the most part measure no optical power at all and sometimes a little optical power. This makes fault-tracing essentially more difficult in a system with several fibres, since it may thereby be difficult to determine in which fibre there is a disruption.

Another advantage of having short pulses delivered with a short time interval between the pulses is that in this manner it is the transmitted average power which determines whether the pulses are harmful to the eye of a person who for example looks into an optical fibre. This relates to the fact that the biological tissue which possibly may be damaged reacts on the average power over a certain time and not on the instantaneous power. If the pulses are delivered with a longer time interval, for example with a distance of several seconds or longer, it is however not the case that the average power over a long time is decisive for a possible damage on the eye. Furthermore, it is often according to different standards a requirement that the average power of the transmitted light pulses does not exceed a certain value. An advantage of the present invention is that this average power directly may be calculated or measured, which makes it possible to in a simple manner make sure that a certain standard is fulfilled.

A further advantage of the invention is that the device, in spite of the fact that it works so fast, may protect against eye damages in a similar manner as previous slower working systems.

FIG. 2 also shows that the transmitter-receiver device A may have further components. FIG. 2 thus shows that RXA has an output 141 where an information carrying signal from RXA is transmitted. In a similar manner, TXA has a further input 143 where an information carrying electric signal is received by TXA. The receiver unit RXA also has a fourth output 111 which is connected to the supervising unit CUA.

At the fourth output 111, a signal is the case which indicates whether the receiver unit RXA receives an information carrying signal via the first optical fibre F1. Furthermore, the supervising unit CUA has a fifth output 113. On this fifth output 113, a status signal is the case which depends on the status of the signal of the third output 109 and the status of the signal from the fourth output 111. The fifth output 113 may suitably be connected to a second visual indicator 121 and/or to the network management system NMS. The supervising unit CUA may suitably be arranged such that the second indicator 121 is lit if the fourth output 111 indicates that the receiver unit RXA receives an information carrying signal at the same time as the output 109 indicates that the connection works. The reason that the output 111 is connected to the supervising unit CUA instead of to be directly connected to, for example, the second indicator 121 is that when the optical connection does not work, some light may sometimes still be received which would mean that the second indicator 121 would twinkle.

The transmitter unit TXA also has a sixth output 115 which is connected to the supervising unit CUA. At the sixth output 115 a signal is the case which indicates if the transmitter unit TXA receives an electric information carrying signal on the input 143. The supervising unit CUA also has a seventh output 117. The seventh output 117 has a status signal which depends on the status of the signal of the third output 109 and the status of the signal from the sixth output 115. This seventh output 117 may be connected to a third indicator 123 and/or to the network management system NMS. The supervising unit CUA is suitably arranged such that said seventh output 117 has a certain status if both the output 109 shows that the connection works and the output 115 shows that TXA receives an information carrying signal.

The supervising unit CUA is suitably arranged such that the status of the signals at said third, fourth, fifth, sixth, and seventh outputs (109, 111, 113, 115, 117) fulfils the following status schedule:

| Fourth output | Sixth output | Third output = 0 | Third output = 1 |
|---|---|---|---|
| 0 | 0 | Fifth output = 0<br>Seventh output = 0 | Fifth output = 0<br>Seventh output = 0 |
| 0 | 1 | Fifth output = 0<br>Seventh output = 0 | Fifth output = 0<br>Seventh output = 1 |
| 1 | 1 | Fifth output = 0<br>Seventh output = 0 | Fifth output = 1<br>Seventh output = 1 |
| 1 | 0 | Fifth output = 0<br>Seventh output = 0 | Fifth output = 1<br>Seventh output = 0 | wherein the first column indicates the status of the fourth output 111, the second column indicates the status of the sixth output 115, in the third column the third output 109 has status=0 and in the fourth column the third output 109 has status=1, and wherein the respective status stands for the following:

Third output 109=1, the connection works and the transmitter-receiver device is not in said test mode;

Third output 109=0, the transmitter-receiver device is in said test mode;

Fourth output 111=1, the receiver unit RXA receives an information carrying signal;

Fourth output 111=0, the receiver unit RXA does not receive an information carrying signal;

Fifth output 113=1, indicates that there is a working optical connection with an information carrying signal to the receiver unit RXA;

Fifth output 113=0, indicates that there is no working optical connection with an information carrying signal to the receiver unit RXA;

Sixth output 115=1, the transmitter unit TXA receives an electric information carrying input signal;

Sixth output 115=0, the transmitter unit TXA does not receive an electric information carrying input signal;

Seventh output 117=1, indicates that there is a working optical connection with an information carrying signal which is transmitted from the transmitter unit TXA;

Seventh output 117=0, indicates that there is no working optical connection with an information carrying signal which is transmitted from the transmitter unit TXA.

As has been mentioned above, the device a may be used in a communication system together with a corresponding device B. When these devices A, B form part of a communication system of the kind that is shown in FIG. 1, the great advantage is obtained by the invention that the status of said third 109, fifth 113, and seventh 117 outputs of one transmitter-receiver device A is exactly the same as the status of the corresponding outputs in the device B. This means, as has been explained above, that the status of the third output 109, which indicates whether the connection works, is the same both in the device A and the device B. Furthermore, the status of the fifth output 113, which indicates whether the device A receives an information carrying signal, is the same as the status of the seventh output 117 of the device B, which seventh output of the device B indicates that TXB transmits an information carrying signal. In a corresponding manner, the status of the fifth output 113 of the device B is the same as the status of the seventh output 117 of the device A. By only supervising, for example, the device A, one knows, for instance, that if the seventh output 117 has a certain status, then an information carrying signal is transmitted on the optical fibre F2 from the transmitter unit TXA, but, furthermore, one knows that this signal is received by the receiver unit TXB, since the seventh output also indicates that the optical connection over the fibres F1 and F2 between the device A and the device B works.

A transmitter-receiver device according to the invention may suitable be arranged on a circuit card. Such a device A may, for example, be arranged in or in connection to a wall in a home or in an office. The device may, of course, also form part of a centrally located device which is controlled by a network operator which transmits and receives signals to a device arranged in a home or in an office.

It should be noted that by "light" is in this application not necessarily meant that the light must be visible. Also invisible electromagnetic radiation may be transferred over the optical conduction paths.

The invention is not limited to the shown embodiments but may be varied within the scope of the following claims.

The invention claimed is:

1. A transmitter-receiver device comprising a receiver unit arranged to via a first optical conduction path receive light and optical signals and comprising a first output which indicates whether the receiver unit receives light, a transmitter unit arranged to on a second optical conduction path transmit light and optical signals and comprising a first input which controls whether the transmitter unit shall transmit light, a supervising unit with a second input connected to said first output and a second output connected to said first input and arranged to via said second output prevent the transmitter unit from continuously transmitting light when the supervising unit via the second input detects that the receiver unit does not receive light, wherein the supervising unit is arranged to, when it detects that the receiver unit does not receive light, change to a test mode where the supervising unit controls the transmitter unit to intermittently transmit short light pulses on said second optical conduction path, wherein the supervising unit is arranged with a third output where a status signal indicates whether the transmitter-receiver device is in said test mode and wherein the supervising unit is arranged such that when the transmitter-receiver is in said test mode, the time between said light pulses is less than 1 s.

2. A transmitter-receiver device according claim 1, wherein the supervising unit is arranged such that when the transmitter-receiver device is in said test mode, the time between said light pulses is less than 0.1 s.

3. A transmitter-receiver device according to claim 1, comprising a first indicator, which gives a visual indication of the status of the signal from said third output.

4. A transmitter-receiver device according to claim 1, wherein the receiver unit is arranged with a fourth output which is connected to the supervising unit, at which fourth output a signal is the case which indicates whether the receiver unit, via the first optical conduction path, receives an information carrying input signal, wherein the supervising unit has a fifth output with a status signal which depends both on the status of the signal of said third output and the status of the signal from said fourth output.

5. A transmitter-receiver device according to claim 4, comprising a second indicator which gives a visual indication of the status of the signal from said fifth output.

6. A transmitter-receiver device according to claim 4, wherein the supervising unit is arranged such that the status of the signals at said third, fourth, fifth, sixth, and seventh outputs fulfils the following status schedule:

| Fourth output | Sixth output | Third output = 0 | Third output = 1 |
|---|---|---|---|
| 0 | 0 | Fifth output = 0<br>Seventh output = 0 | Fifth output = 0<br>Seventh output = 0 |
| 0 | 1 | Fifth output = 0<br>Seventh output = 0 | Fifth output = 0<br>Seventh output = 1 |
| 1 | 1 | Fifth output = 0<br>Seventh output = 0 | Fifth output = 1<br>Seventh output = 1 |
| 1 | 0 | Fifth output = 0<br>Seventh output = 0 | Fifth output = 1<br>Seventh output = 0 | wherein the first column indicates the status of the fourth output, the second column indicates the status of the sixth output, in the third column the third output has status=0 and in the fourth column the third output has status=1, and wherein the respective status stands for the following:

Third output=1, connection works and the transmitter-receiver device is not in said test mode;

Third output=0, the transmitter-receiver device is in said test mode;

Fourth output=1, the receiver unit receives an information carrying signal;

Fourth output=0, the receiver unit does not receive an information carrying signal;

Fifth output=1, indicates that there is a working optical connection with an information carrying signal to the receiver unit;

Fifth output=0, indicates that there is no working optical connection with an information carrying signal to the receiver unit;

Sixth output=1, the transmitter unit receives an electric information carrying input signal;

Sixth output=0, the transmitter unit does not receive an electric information carrying input signal;

Seventh output =1, indicates that there is a working optical connection with an information carrying signal which is transmitted from the transmitter unit;

Seventh output=0, indicates that there is no working optical connection with an information carrying signal which is transmitted from the transmitter unit.

7. A transmitter-receiver device according to claim 1, wherein the transmitter unit is arranged with a sixth output which is connected to the supervising unit at which sixth output a signal is the case which indicates whether the transmitter unit receives an electric information carrying input signal, wherein the supervising unit has a seventh output with a status signal which depends both on the status of the signal of said third output and the status of the signal from said sixth output.

8. A transmitter-receiver device according to claim 7, comprising a third indicator, which gives a visual indication of the status of the signal from said seventh output.

9. A communication system comprising a first transmitter-receiver device and a second transmitter-receiver device according to claim 1, and a first and a second optical conduction path which connect the first and the second transmitter-reciever device to each other, wherein the first optical conduction path is connected to the receiver unit of the first transmitter-receiver device and the transmitter unit of the second transmitter-receiver device, wherein the second optical conduction path is connected to the receiver unit of the second transmitter-receiver device and the transmitter unit of the first transmitter-receiver device.

10. A communication system according to claim 9, comprising a network management system, wherein at least one of said first and second transmitter-reciever devices is connected to the network management system.

11. A communication system according to claim 10, wherein at least said third output of said at least one transmitter-receiver device is connected to the network management system.

12. A communication system according to claim 11, comprising at least one transmitter-receiver device arranged such that also said fifth and seventh outputs are connected to the network management system.

13. A communication system according to claim 9, wherein the communication system is arranged such that said third, fifth, and seventh outputs of the first transmitter-receiver device, except for possibly during a short time delay, have the same status as the third, seventh, and fifth, respectively, outputs of the second transmitter-receiver device.

* * * * *